(12) United States Patent
Ono et al.

(10) Patent No.: US 8,722,001 B2
(45) Date of Patent: May 13, 2014

(54) CATALYST FOR PURIFICATION OF EXHAUST GAS AND METHOD FOR PURIFICATION USING THE SAME

(75) Inventors: Mariko Ono, Himeji (JP); Akihisa Okumura, Himeji (JP)

(73) Assignees: Umicore Shokubai Japan Co., Ltd., Tokyo (JP); Umicore Shokubai USA, Inc., Auburn Hills, MI (US)

( * ) Notice: Subject to any disclaimer, the term of this patent is extended or adjusted under 35 U.S.C. 154(b) by 310 days.

(21) Appl. No.: 13/124,147

(22) PCT Filed: Oct. 16, 2009

(86) PCT No.: PCT/JP2009/067888
§ 371 (c)(1),
(2), (4) Date: Apr. 14, 2011

(87) PCT Pub. No.: WO2010/044453
PCT Pub. Date: Apr. 22, 2010

(65) Prior Publication Data
US 2011/0200506 A1    Aug. 18, 2011

(30) Foreign Application Priority Data
Oct. 17, 2008  (JP) .................................. 2008-268757

(51) Int. Cl.
| | | |
|---|---|---|
| B01D 53/56 | (2006.01) |
| B01D 53/94 | (2006.01) |
| B01J 8/02 | (2006.01) |
| B01J 21/04 | (2006.01) |
| B01J 23/00 | (2006.01) |
| B01J 23/02 | (2006.01) |
| B01J 23/06 | (2006.01) |
| B01J 23/08 | (2006.01) |
| B01J 23/10 | (2006.01) |
| B01J 23/40 | (2006.01) |
| B01J 23/42 | (2006.01) |
| B01J 23/44 | (2006.01) |
| B01J 23/56 | (2006.01) |
| B01J 23/58 | (2006.01) |

(52) U.S. Cl.
USPC ........ 423/213.5; 502/302; 502/306; 502/324; 502/327; 502/328; 502/332; 502/333; 502/334; 502/339; 502/340; 502/341; 502/355; 502/439

(58) Field of Classification Search
USPC ......... 502/327, 328, 332–334, 339, 340, 341, 502/355, 439, 302, 306, 324; 423/213.5
See application file for complete search history.

(56) References Cited

U.S. PATENT DOCUMENTS 6,350,421 B1  2/2002  Strehlau et al.
7,438,866 B2 * 10/2008  Iizuka et al. .................. 422/180

FOREIGN PATENT DOCUMENTS

EP    0 369 576    5/1990
EP    0941757     9/1999
(Continued)

*Primary Examiner* — Cam N. Nguyen
(74) *Attorney, Agent, or Firm* — Cesari and McKenna, LLP (57) ABSTRACT

A catalyst for the purification of exhaust gas that can be used to highly efficiently treat an exhaust gas which has moisture and fluctuates between an oxidizing atmosphere and a reducing atmosphere even after the catalyst is exposed to a high temperature is provided. The present invention relates to a catalyst for the purification of exhaust gas having a catalyst layer of catalyst components comprising a noble metal, magnesium oxide, and a refractory inorganic oxide formed on a three-dimensional structure, wherein the catalyst layer has two peaks originated from the magnesium oxide in a pore distribution obtained by mercury intrusion technique.

14 Claims, 2 Drawing Sheets

(56) References Cited

FOREIGN PATENT DOCUMENTS

| EP | 0982066 | 3/2000 |
|---|---|---|
| EP | 1475149 | 11/2004 |
| JP | 10-066869 | 3/1998 |
| JP | 2002-256926 | 9/2002 |
| JP | 2002-306964 | 10/2002 |
| JP | 2004-169609 | 6/2004 |
| JP | 2007-196146 | 8/2007 |
| JP | 2009-174389 | 8/2009 |

* cited by examiner

CATALYST FOR PURIFICATION OF EXHAUST GAS AND METHOD FOR PURIFICATION USING THE SAME

CROSS REFERENCE TO RELATED APPLICATIONS

This application is a National Stage of International Application No. PCT/JP2009/067888, filed on Oct. 16, 2009 which claims priority to Japanese Application No. 2008-268757 filed Oct. 17, 2008. The content of the prior applications are incorporated herein by reference in their entirety.

TECHNICAL FIELD

The present invention relates to a catalyst for the purification of exhaust gas and a method for the purification of exhaust gas using the catalyst. In more detail, the present invention relates to a catalyst for the purification of exhaust gas for removing hydrocarbon (HC), carbon monoxide (CO), and nitrogen oxides (NOx), particularly NOx, among hazardous components contained in exhaust gas of gasoline engine and diesel engine, and a method for the purification of exhaust gas using the catalyst.

BACKGROUND ART

NOx in atmosphere causes photochemical smog or acid rain. Therefore, exhaustion of NOx from a mobile emission source such as an automobile equipped with an internal combustion engine such as gasoline engine or diesel engine, which is one of NOx sources, has become a social problem. For this reason, investigation has been progressed in the direction of making a law and regulations on exhaustion amount of NOx severer in the future. Accordingly, development of a catalyst for the purification of exhaust gas has been attracted attention.

For example, it has been disclosed that NOx can be adsorbed by using zeolite having a noble metal supported thereon (Patent Literature 1). In addition, a catalyst having NOx storage effect which comprises calcium and platinum or palladium, has been proposed (Patent Literature 2).

PRIOR ART LITERATURES

Patent Literatures

Patent Literature 1: EP-A-0 369 576
Patent Literature 2: JP-A-2002-306964

DISCLOSURE OF THE INVENTION

Problem to be Solved by the Invention

However, in the catalyst system disclosed in the Patent Literature 1, zeolite is used as an alternative of rhodium, for the purpose of reducing use amount of rhodium which is a particularly rare and expensive resource among noble metal components. Because of no optimization as an adsorbing material, there is a problem of insufficient adsorption effect. In addition, because of low concentration of palladium in the catalyst, it has insufficient ignition capability and purification capability, and has thus such defect that it cannot effectively purify high concentration hazardous components eliminated from an adsorption material with an engine warm-up.

In addition, in the Patent Literature 1 or 2, a technology of removing NOx in such a state as that exhaust gas is in oxidation atmosphere and at high temperature to some extent is provided. As one of problems in purifying exhaust gas, there is, in particular, decrease in purification activity of NOx by exposure of a catalyst to high temperature. However, the Patent Literature 1 or 2 is not one solving this problem sufficiently. In particular, in the midst of becoming ever severer regulations on exhaust gas purification year by year, such a catalyst that can efficiently treat an exhaust gas which has moisture and fluctuates between an oxidizing atmosphere and a reducing atmosphere even after the catalyst is exposed to a high temperature has been desired. In particular, as for removal of NOx, very high level is required. However, such a catalyst is still not present at all that can efficiently treat an exhaust gas which has moisture and fluctuates between an oxidizing atmosphere and a reducing atmosphere even after the catalyst is exposed to a high temperature.

The present invention has been attained, in view of the above circumstances, and aims at providing a catalyst for the purification of exhaust gas that can efficiently treat an exhaust gas which has moisture and fluctuates between an oxidizing atmosphere and a reducing atmosphere even after the catalyst is exposed to a high temperature.

It is another object of the present invention to provide a catalyst for the purification of exhaust gas that can efficiently remove carbon monoxide (CO), hydrocarbon (HC), and nitrogen oxides (NOx), which are hazardous components contained in exhaust gas, particularly NOx.

It is further another object of the present invention to provide a method for the production of a catalyst for purifying exhaust gas that can efficiently treat an exhaust gas which has moisture and fluctuates between an oxidizing atmosphere and a reducing atmosphere even after the catalyst is exposed to a high temperature.

It is still more another object of the present invention to provide a method for purifying exhaust gas that can efficiently remove CO, HC, and NOx, which are hazardous components contained in exhaust gas, particularly NOx.

Means for Solving the Problem

The present inventors have intensively studied a way to attain the objects as mentioned above, to find that a catalyst comprising magnesium oxide has specific pore distribution, can efficiently remove CO, HC, and NOx, particularly NOx, which are hazardous components contained in exhaust gas, and hardly decreases purification ratio of NOx with time. Consequently, they have completed the present invention.

That is, the above object may be attained by a catalyst for the purification of exhaust gas having a catalyst layer of catalyst components comprising a noble metal, magnesium oxide, and a refractory inorganic oxide formed on a three-dimensional structure, wherein the catalyst layer has two peaks originated from the magnesium oxide in a pore distribution obtained by mercury intrusion technique.

In addition, the above object may be also attained by a method for the purification of exhaust gas which comprises contacting the exhaust gas with the catalyst for the purification of exhaust gas of the present invention.

Effects of the Invention

According to the present invention, CO, HC, and NOx, which are hazardous components contained in exhaust gas, particularly NOx, can be removed efficiently. The present invention can be used as, what is called, a NOx trapping catalyst, which stores NOx in oxidizing atmosphere, and releases and reduces NOx in reducing atmosphere. In addition, this superior purification ratio of exhaust gas can be maintained for a long period. By using the catalyst for the purification of exhaust gas of the present invention, an exhaust gas, which has moisture and fluctuates between an oxidizing atmosphere and a reducing atmosphere, can be efficiently treated even after the catalyst is exposed to a high temperature.

BRIEF DESCRIPTION OF THE DRAWINGS

[Fig. 1] Evaluation 1.

[Fig. 2] Evaluation 2.

MODE FOR CARRYING OUT THE INVENTION

According to a first aspect of the present invention, a catalyst for the purification of exhaust gas having a catalyst layer of catalyst components comprising a noble metal, magnesium oxide, and a refractory inorganic oxide formed on a three-dimensional structure, wherein the catalyst layer has two peaks originated from the magnesium oxide in a pore distribution obtained by mercury intrusion technique is provided. The catalyst for the purification of exhaust gas of the present invention essentially contains magnesium oxide (MgO). By introducing the magnesium oxide into the catalyst layer, removal efficiency of CO, HC, and NOx, particularly NOx, can be enhanced. Although a mechanism of obtaining such result is not clear, it is considered as follows. It should be noted that the present invention should not be limited by the following assumption. In contacting exhaust gas with the catalyst layer, exhaust gas diffuses into the catalyst layer. The more easily exhaust gas diffuses, the more amount of exhaust gas the catalyst can treat within unit time, which is preferable. The catalyst layer has pores which particles composing the catalyst layer have themselves, or pore volume distribution based on space between the particles, depending on composition thereof. Diffusion of exhaust gas into the catalyst layer is influenced by pore volume or pore distribution of the catalyst layer. On the contrary, the addition of the magnesium oxide to the catalyst layer can form new pores, in particular, pores with a diameter of about 1 to 5 μm, in the catalyst layer. Because the magnesium oxide has relatively high water absorption property, slurry containing the magnesium oxide easily keeps moisture. When a three-dimensional structure (for example, a honeycomb substrate) is immersed into such slurry, and dried and calcined after removing excess slurry, pores with a large pore diameter (for example, 1 to 5 μm) may be formed in the catalyst layer, by evaporation of moisture absorbed by the magnesium oxide during the drying and calcining step, or by shrinking of the magnesium oxide during the drying and calcining step. Therefore, when the magnesium oxide is contained in the catalyst, pore volume of the catalyst layer increases, and exhaust gas diffuses more easily in the catalyst layer, and thus hazardous components such as HC, CO, NOx contained in exhaust gas, particularly NOx, can be purified efficiently. In addition, because these pores formed are based on spaces between particles, purification capability can be maintained for a long period without being lost caused by what is called sintering or the like, even in exposure of the catalyst to high temperature.

Therefore, the catalyst for the purification of exhaust gas obtained by using the magnesium oxide as the catalyst component, can attain superior purification capability of HC, CO, NOx and the like, which are hazardous components in exhaust gas, particularly NOx, and still more can maintain the relevant purification capability for a long period.

Explanation will be given below on embodiments of the present invention.

As described above, the catalyst for the purification of exhaust gas of the present invention has two peaks originated from the magnesium oxide, in the pore distribution of the catalyst layer. In the present description, the two peaks originated from the magnesium oxide are not especially limited. Preferably, they are a first peak present in the range of 1 to 5 μm, and a second peak present in the range of 0.1 to 1 μm. Among these, in particular, the pores originated from the first peak, are relatively large pores. Accordingly, by presence of the pores with such a large diameter in the catalyst, total pore volume of the catalyst layer increases, and exhaust gas diffuses in the catalyst layer easily, and thus hazardous components such as HC, CO, NOx and the like, which are contained in exhaust gas, particularly NOx, can be purified efficiently, and also purification capability can be maintained for a long period. On the contrary, the pores originated from the second peak have smaller pore diameter as compared with the pores of the first peak. By the presence of the pores with such a small diameter in the catalyst, total pore volume of the catalyst layer increases, as well as exhaust gas diffuses in the catalyst layer easily, specific surface area increases, and the number of activated points of the catalyst increases, which is advantageous in view of catalyst performance.

In the present invention, the first peak and the second peak originated from the magnesium oxide are preferably present in pore distribution of the catalyst. In the present description, ratio of pore volume corresponding to each peak, relative to total pore volume is not especially limited. In consideration of purification capability or purification maintaining capability of hazardous gas, diffusion property of gas or the like, ratio of pore volume in the range of 1 to 5 μm which corresponds to the first peak is preferably 5 to 30%, and more preferably 10 to 25%, relative to total pore volume. By presence of the pores with such a relatively large diameter in the degree as described above, total pore volume of the catalyst layer may increase, and good diffusion of exhaust gas in the catalyst layer may be secured. In the present invention, total pore volume of the catalyst layer is not especially limited. In consideration of purification capability or purification maintaining capability of hazardous gas, diffusion property of gas or the like, it is preferably 0.01 to 1 ml/g, and more preferably 0.05 to 0.5 ml/g.

In addition, ratio of pore volume in the range of 0.1 to 1 μm which corresponds to the second peak is 0.5 to 30%, more preferably 0.7 to 20%, still, more preferably 1 to 10%, and particularly preferably 1 to 5%, relative to pore volume in the range of 1 to 5 μm which corresponds to the first peak. By presence of the pores with such a relatively small diameter in the degree as described above, total pore volume of the catalyst layer may be increased, and good diffusion of exhaust gas inside the catalyst layer can be secured. In addition, because of increase in specific surface area of the catalyst layer and increase in the number of active points of the catalyst, catalyst performance can be enhanced.

It should be noted that, there may be the case where the catalyst layer of conventional technology also has a peak in the range of 0.1 to 1 μm which corresponds to the second peak, in the pore distribution, however, pore volume in that range is small, and there was not the case of having both the first and the second peaks.

In the present description, the ratio of pore volume in the range of 1 to 5 μm which corresponds to the first peak, relative to total pore volume, or the ratio of pore volume in the range of 0.1 to 1 μm which corresponds to the second peak, relative to pore volume in the range of 1 to 5 μm which corresponds to the first peak, can be measured by integral penetration amount of the relevant range, in measurement of pore distribution by mercury intrusion technique. For example, in the case of the first peak, pore distribution of the catalyst layer containing the magnesium oxide is measured, and in this pore distribution, pore volume ($P_1$) in the range of 1 to 5 μm which corresponds to the first peak and total pore volume ($P_2$) are determined. Using these $P_1$ and $P_2$, the ratio of the pore volume of the range which corresponds to the first peak, relative to total pore volume, is calculated by the following equation.

Ratio of pore volume in the range of 1 to 5 μm which corresponds to the first peak, relative to total pore volume (%)=($P_1/P_2$)×100    [Expression 1]

In the case of the second peak, similarly, pore volume ($P_3$) in the range of 0.1 to 1 μm which corresponds to the second peak, is determined. Using these $P_3$ and the $P_1$, the ratio of pore volume in the range of 0.1 to 1 μm which corresponds to the second peak, relative to pore volume in the range of 1 to 5 μm which corresponds to the first peak, is calculated by the following equation.

Ratio of pore volume in the range of 0.1 to 1 μm which corresponds to the second peak, relative to pore volume in the range of 1 to 5 μm which corresponds to the first peak=$P_3/P_1$    [Expression 2]

In the present description, pore distribution (the first peak/the second peak) and pore volume are determined by measurement by mercury intrusion technique. Specifically, they are measured according to a method described in the following Examples.

In addition, in the present invention, the magnesium oxide is not especially limited as for shape or size thereof. The magnesium oxide may take shape of, for example, particle, fine particle, powder, cylinder, cone, rectangular column, cubic, pyramid, or amorphous shape. Preferably, the magnesium oxide is particle, fine particle or powder shape. In the present invention, used amount of the magnesium oxide (as will be described later in detail, in the case where the catalyst components cover the three-dimensional structure, a supported amount to the three-dimensional structure; the same hereafter) is not especially limited. Specifically, the used amount (supported amount) of the magnesium oxide is 0.5 to 9 g, and more preferably, 1 to 5 g, per 1 liter (L) of the catalyst (for example, the three-dimensional structure). In the present description, the used amount (supported amount) of the magnesium oxide below the lower limit would not provide sufficient formation of the pores by the magnesium oxide, and would not provide sufficient diffusion property and maintenance of purification performance of exhaust gas. On the contrary, the amount over the upper limit would not provide effect comparable to the addition of the magnesium oxide, and also too much increase in the pores with large pore diameter in the catalyst layer decreases mechanical strength of the catalyst layer, resulting in peeling of the catalyst layer from the three-dimensional structure.

The catalyst for the purification of exhaust gas of the present invention contains a refractory inorganic oxide as a catalyst component. In the present description, the refractory inorganic oxide is not especially limited, as long as it is any one which may be used as a catalyst for a usual internal combustion engine. Specifically, the refractory inorganic oxide which may be used in the present invention is any one, which is used as a usual catalyst carrier, and, for example, a single oxide such as activated alumina such as α-alumina, γ-alumina, δ-alumina, η-alumina, and θ-alumina, titania, zirconia, silicon oxide (silica); and a complex oxide thereof, for example, alumina-titania, alumina-zirconia, titania-zirconia, zeolite, silica-alumina, and the like may be included. Preferably, the single oxide such as γ-alumina, silica, titania, and zirconia, and the complex oxide thereof is used. The above refractory inorganic oxide may be used alone or may be used as a mixture form of two or more kinds.

BET (Brunauer-Emmett-Teller) specific surface area of the refractory inorganic oxide is not especially limited. It is preferably 20 to 750 m$^2$/g, and more preferably 50 to 350 m$^2$/g. In addition, average particle diameter of the refractory inorganic oxide is also not especially limited. It is preferably 0.5 to 150 μm, and more preferably 1 to 100 μm. In the present description, "average particle diameter" can be measured as an average value of particle diameter measured by a known method such as a laser diffraction method or a dynamic light scattering method.

In the case of using a refractory inorganic oxide, used amount (supported amount) of the refractory inorganic oxide is not especially limited. The used amount (supported amount) of the refractory inorganic oxide is preferably 10 to 400 g, and more preferably 50 to 300 g, per 1 liter (L) of a catalyst (for example, a three-dimensional structure). The amount below 10 g would not provide sufficient dispersion of a catalyst component (for example, magnesium oxide or a noble metal which is described in detail below), and would not provide sufficient durability. On the contrary, the amount over 400 g would not provide effect comparable to the addition of the refractory inorganic oxide, and also would not exhibit sufficient effect of a catalyst component (for example, magnesium oxide or a noble metal which is described in detail below), and would decrease activity or increase pressure loss.

The catalyst for the purification of exhaust gas of the present invention further contains a noble metal in addition to the magnesium oxide and the refractory inorganic oxide. The noble metal which can be used in the present invention is not especially limited, and can be selected as appropriate, depending on a hazardous component to be purified (removed). For example, as the noble metal which is used preferably, platinum (Pt), palladium (Pd), rhodium (Rh), iridium (Ir), ruthenium (Ru) or the like may be included. Among these, preferably Pt, Pd, Rh and Ir are used, and Pt, Pd and Rh are more preferable.

In the case of further using the noble metal, used amount (supported amount) of the noble metal is not especially limited, and can be selected as appropriate, depending on a hazardous component to be purified (removed). Specifically, the noble metal can be used in an amount of preferably 0.1 to 15 g, and more preferably 0.5 to 5 g, per 1 liter (L) of a catalyst (for example, a three-dimensional structure). Within such a range, a hazardous component can be removed (purified) sufficiently.

The catalyst for the purification of exhaust gas of the present invention may comprise, in addition to the magnesium oxide, the refractory inorganic oxide and the noble metal, an oxide of at least one element selected from the group consisting of alkali metals, alkaline earth metals, rare-earth elements, manganese and tungsten (hereinafter also referred to as "other oxide"). As the alkali metal oxide used in the present description, an oxide of sodium, potassium, rubidium, and cesium may be included. Similarly, as the alkaline earth metal oxide, an oxide of strontium and barium may be included. As the oxide of rare-earth element, for example, an oxide of the rare-earth element selected from the group consisting of cerium, lanthanum, praseodymium, neodymium, samarium, europium, gadolinium, terbium, dysprosium, holmium, erbium and the like may be included. The other oxide may be used alone or may be used as a mixture form of two or more members. Among these, oxides of alkali metal, alkaline earth metal and rare-earth element are preferable. More preferably, sodium oxide, potassium oxide, barium oxide, cerium oxide (ceria), and lanthanum oxide may be used, and particularly preferably, potassium oxide, barium oxide or ceria may be used.

The term "ceria" in the present description includes thin plate-like ceria in addition to known particle-like/powder-like ceria. In the case of the particle-like/powder-like ceria, size of the ceria is not especially limited. An average particle diameter is preferably in the range of 0.1 to 100 μm. In the case of the particle-like/powder-like ceria, BET specific surface area is also not especially limited. It is preferably 10 to 300 $m^2/g$, for example.

In the present invention, when a catalyst component uses such other oxide as described above, used amount (supported amount) of the other oxide is not especially limited. For example, used amount (supported amount) of the other oxide is preferably about 1 to 200 g, per 1 liter (L) of a catalyst (for example, a three-dimensional structure). The used amount (supported amount) of the other oxide below the lower limit would not provide sufficient dispersion of the other oxide, and would not provide effect comparable to the addition. On the contrary, the amount over the upper limit would not provide effect comparable to the addition amount of the other oxide, and also would not exhibit sufficient effect of a catalyst component (for example, the magnesium oxide or the noble metal), and would decrease activity.

In the catalyst for the purification of exhaust gas of the present invention, a catalyst layer containing the catalyst components may be formed on a three-dimensional structure, that is, the catalyst components cover a three-dimensional structure. In the present description, the three-dimensional structure covered with the catalyst components may include a heat resistant carrier such as a honeycomb substrate. An integrally molded honeycomb structure is preferable, which may include, for example, a monolithic honeycomb substrate, a plug honeycomb substrate or the like.

As the monolithic carrier, what is called a ceramic honeycomb substrate can be used. In particular, honeycomb substrates made of a material such as cordierite, mullite, α-alumina zirconia, titania, titanium phosphate, aluminum titanate, aluminosilicate, magnesium silicate, and silicon carbide may be preferably cited. Among these, one made of cordierite is particularly preferably used. In addition to these, what is called a metal honeycomb substrate may also be used, which is a integral structure made by using an oxidation-resistant and heat-resistant metal, such as stainless steel and a Fe—Cr—Al alloy. A plug-like honeycomb substrate may also be used. As used herein, the plug honeycomb is referred to a honeycomb having a number of through-cells, and has open cells and closed cells present checkerwise on a gas inlet face, wherein one side of a through-cell is open while the other side thereof is closed. The plug honeycomb substrate has fine pores on the wall between each of the cells, and exhaust gas enters the honeycomb from the open cells and comes out the honeycomb from other cells via the fine pores.

The monolithic carrier can be produced by an extrusion molding method or a method for winding and fastening a sheet-like element. Shape of a gas passing channel (cell shape) may be any of hexagonal shape, quadrangular shape, triangle shape or corrugation shape. A cell density (cell number/unit cross-sectional area) of 100 to 1200 cells/$inch^2$ is enough for use, and it is preferably 200 to 900 cells/$inch^2$, and more preferably 300 to 600 cells/$inch^2$.

A production method of the catalyst for the purification of exhaust gas of the present invention is not especially limited, and a known method may be used similarly or by modification as appropriate. Description will be given below on methods (1) to (3), as preferable embodiments of the preparation method of the catalyst of the present invention. However, the preparation method of the catalyst of the present invention should not be limited to the following procedures, as long as it should not depart from a scope of the present invention.

(1) A catalyst component(s) (for example, a refractory inorganic oxide, a noble metal/a water-soluble noble metal salt, magnesium oxide, other oxide and the like) is dissolved or dispersed in a suitable aqueous medium, to obtain catalyst component solution or dispersion. Next, the resultant catalyst component solution or dispersion is subjected to wet milling, to prepare slurry. Further, by immersing a three-dimensional structure (for example, a honeycomb substrate) with the slurry, removing excess slurry, and then drying and calcining the structure, the catalyst is obtained. In the method (1), when the catalyst for the purification of exhaust gas of the present invention does not use other oxide, a similar method is applicable, except that the unused component is not added.

In the method, the magnesium oxide is preferably added in a form as it is, that is, as the oxide (magnesium oxide), because it is added to an aqueous medium as described above. In addition, a magnesium salt of other form, which is converted into magnesium oxide by calcining, may be added further in addition to the oxide. In the present description, the magnesium salt is not especially limited. A nitrate salt, an acetate salt, a carbonate salt, a sulfate salt, a hydroxide, a halide or the like of magnesium may be cited. Among these, a nitrate salt (magnesium nitrate) and an acetate salt (magnesium acetate) are more preferable. Addition amount of the magnesium oxide and other magnesium salt is not especially limited. It is preferable so as to yield an amount specified by the amount of the magnesium oxide.

In the method, in adding in the form of magnesium oxide into an aqueous medium, BET (Brunauer-Emmett-Teller) specific surface area of the magnesium oxide is not especially limited. In consideration of purification capability or purification maintaining capability of hazardous gas, it is preferably 5 to 200 $m^2/g$, and more preferably 10 to 150 $m^2/g$. Average particle diameter of the magnesium oxide is not especially limited. In consideration of purification capability or purification maintaining capability of hazardous gas, it is preferably 0.001 to 2 μm, and more preferably 0.01 to 1 μm.

A form of a refractory inorganic oxide is also not especially limited, and the refractory inorganic oxide may be added in a form as it is, or may be added in another form and after that it may be converted to desired form. It is preferably added in a form as it is. The refractory inorganic oxide may be used alone or may be used in a mixture form of two or more members. Addition amount of the refractory inorganic oxide is not especially limited. It is preferable so as to yield an amount specified by the amount of the refractory inorganic oxide.

When the catalyst component contains the other oxide, form of the other oxide is also not especially limited, and the other oxide may be added in a form as it is, or may be added in another form and after that it may be converted to desired form. It is preferably added in a form as it is. The other oxide may be used alone or may be used in a mixture form of two or more members. Addition amount of the other oxide is not especially limited. It is preferable so as to yield an amount specified by the amount of the other oxide.

Further, a form of a noble metal is also not especially limited, and the noble metal may be added in a form as it is, or may be added in another form and after that it may be converted to desired form. The noble metal is preferably added in another form, particularly in a form of water-soluble noble metal salt, because it is added to an aqueous medium as described above. In the present description, the water-soluble noble metal salt is not especially limited, and raw materials which are used in a field of purification of exhaust gas may be used. Specifically, in the case of palladium, for example, palladium; halides such as palladium chloride; inorganic salts of palladium such as nitrate, sulfate, dinitrodiammine salt, and teraammine salt; carboxylates such as acetate; and hydroxide, alkoxide, oxide and the like may be cited. Preferably, nitrate, dinitrodiammine salt, tetraammine salt and acetate are included, and nitrate (palladium nitrate) is more preferable. In the case of platinum, for example, platinum; halides such as platinum bromide and platinum chloride; inorganic salts of platinum such as dinitrodiammine salt, hexaammine salt, hexahydroxo acid salt, tetranitro acid salt; carboxylates such as acetate; and hydroxide, alkoxide, oxide and the like may be cited. Preferably, dinitrodiammine salt, hexaammine salt, and hexahydroxo acid salt are included, and dinitrodiammine salt (platinum dinitrodiammine) is more preferable. In the case of rhodium, for example, rhodium; halides such as rhodium chloride; inorganic salts of rhodium such as nitrate, sulfate, hexaammine salt, and hexacyanate; carboxylates such as acetate; and hydroxide, alkoxide, oxide and the like may be cited. Preferably, nitrate, and hexaammine salt are included, and nitrate (rhodium nitrate) is more preferable. In the present invention, the noble metal sources may be used alone or may be used as a mixture form of two or more members.

In the method, a suitable aqueous medium is not especially limited, and a suitable aqueous medium, which is usually used in the relevant field, may be used similarly. Specifically, water, lower alcohols such as cyclohexanol, ethanol, 2-propanol, and organic alkaline aqueous solutions and the like may be cited. Preferably, water and lower alcohols are used, and water is particularly preferably used. Addition amount of a catalyst component is not especially limited, as long as it is such amount enough to support a desired amount thereof onto a three-dimensional structure. It is preferable so as to give a concentration of the catalyst component in the aqueous medium of 5 to 75% by mass, and more preferably 15 to 55% by mass. In addition, wet milling of the catalyst component solution or dispersion may be carried out by usually known method, and is not especially limited. A ball mill and the like may be preferably used. Alternatively, a conventionally known means such as a homogenizer, an ultrasonic dispersing apparatus, a sand mill, a jet mill, and a bead mill can also be used. In addition, a supported amount of a catalyst component onto a three-dimensional structure is not especially limited, and such amount is preferable to give the amount specified in each the catalyst component as above.

Next, the catalyst of the present invention is produced by supporting the catalyst components onto a three-dimensional structure, and a method for supporting the catalyst components onto the three-dimensional structure is not especially limited, and a known method can be used similarly or by modification as appropriate. Specifically, a three-dimensional structure is dipped into and immersed with slurry prepared as described above. In this case, immersing conditions are not especially limited, as long as the catalyst components in the slurry are contacted sufficiently with the three-dimensional structure, and these catalyst components are sufficiently supported on the three-dimensional structure in the next drying and calcining step. For example, after immersing a three-dimensional structure with slurry, the three-dimensional structure is pulled up from the slurry to remove excess slurry. After that, by subjecting three-dimensional structure to drying at 100 to 250° C. for 10 minutes to 3 hours and calcining at 350 to 600° C. for 10 minutes to 5 hours, the catalyst for the purification of exhaust gas of the present invention having the catalyst components supported on the three-dimensional structure can be produced.

(2) A water-soluble noble metal salt is dissolved in water, and a noble metal is supported onto a refractory inorganic oxide, to obtain a noble metal-supported refractory inorganic oxide. Next, by dissolving or dispersing the noble metal-supported refractory inorganic oxide, magnesium oxide and other oxide in a suitable aqueous medium, catalyst component solution or dispersion may be obtained. Next, by subjecting the catalyst component solution or dispersion to wet milling, slurry may be obtained. By immersing a three-dimensional structure (for example, a honeycomb substrate) with the slurry, removing excess slurry, and then drying and calcining the structure, the catalyst is obtained. In the method (2), when the catalyst for the purification of exhaust gas of the present invention does not use other oxide, a similar method is applicable, except that the unused component is not added. Terms are defined similarly as in the method (1), unless otherwise specified.

Addition amount of a water-soluble noble metal salt into water is not especially limited. It is preferable so as to yield an amount specified by the amount of the noble metal.

In the present description, a method for supporting a noble metal onto a refractory inorganic oxide is not especially limited, and a known catalyst supporting method may be used similarly or by modification as appropriate. Specifically, a noble metal-supported refractory inorganic oxide can be obtained by immersing a refractory inorganic oxide with an aqueous solution of a water-soluble noble metal salt prepared as above, and drying and calcining the immersed refractory inorganic oxide. In this case, immersing conditions are not especially limited, as long as the water-soluble noble metal salt in the aqueous solution is sufficiently supported onto the refractory inorganic oxide. For example, the refractory inorganic oxide is mixed sufficiently uniformly with the aqueous solution of the water-soluble noble metal in an amount equal to the maximum moisture amount which the refractory inorganic oxide may absorb. After that, by subjecting the refractory inorganic oxide to drying at 100 to 250° C. for 10 minutes to 15 hours, and calcining at 350 to 600° C. for 10 minutes to 5 hours, a noble metal-supported refractory inorganic oxide having the noble metal supported on the refractory inorganic oxide, may be produced.

Next, the catalyst is obtained by dissolving or dispersing the noble metal-supported refractory inorganic oxide, magnesium oxide and other oxide into a suitable aqueous medium, and subjected to wet milling, to prepare slurry. Further, by immersing a three-dimensional structure (for example, a honeycomb substrate) with the slurry, removing excess slurry, and then drying and calcining the structure, the catalyst is obtained. In this case, a mixing ratio of the noble metal-supported refractory inorganic oxide and the magnesium oxide is not especially limited. It is preferable so as to yield an amount specified by the amount of the catalyst components. As for the suitable aqueous medium and the like, similar ones described in the above method (1) can be used. The wet milling of the noble metal-supported refractory inorganic oxide, magnesium oxide and other oxide may be also carried out by a usually known method, and is not especially limited. A ball mill and the like may be preferably used. Alternatively, a conventionally known means such as a homogenizer, an ultrasonic dispersing apparatus, a sand mill, a jet mill, and a bead mill can also be used. Similarly, step of immersing a three-dimensional structure with the slurry, and drying and calcining the structure can be also carried out by the similar steps as described in the method (1).

(3) Slurry may be prepared by dissolving or dispersing, in advance, magnesium oxide, a refractory inorganic oxide and other oxide into a suitable aqueous medium, and by subjecting solution or dispersion to wet milling. Then, a catalyst precursor may be obtained by immersing a three-dimensional structure (for example, a honeycomb substrate) with the slurry, removing excess slurry, drying and calcining. Next, the catalyst may be obtained by dipping and immersing the catalyst precursor into an aqueous solution of a water-soluble noble metal salt in water, removing excess slurry, and then drying and calcining. In the method of (3), when the catalyst for the purification of exhaust gas of the present invention does not use other oxide, a similar method is applicable, except that the unused component is not added. Terms are defined similarly as in the method (1), unless otherwise specified.

In the above case, a mixing ratio of the magnesium oxide and the refractory inorganic oxide is not especially limited. It is preferable so as to yield an amount specified by the amount of the catalyst components. As for the suitable aqueous medium and the like, similar ones described in the above method (1) can be used. The wet milling of the magnesium oxide and the refractory inorganic oxide may be also carried out by a usually known method, and is not especially limited. A ball mill and the like may be preferably used. Alternatively, a conventionally known means such as a homogenizer, an ultrasonic dispersing apparatus, a sand mill, a jet mill, and a bead mill can also be used. Similarly, step of immersing a three-dimensional structure with the slurry, and drying and calcining the structure can be also carried out by the similar steps as described in the method (1).

Next, the catalyst may be obtained by dipping and immersing the catalyst precursor obtained as above into an aqueous solution of a water-soluble noble metal salt in water, drying and calcining. In the present description, as the step for dissolving a water-soluble noble metal salt in water to obtain an aqueous solution, a similar method as described in the method (1) can be used. Immersing conditions of the catalyst precursor into the aqueous solution are not especially limited, as long as the noble metal in the aqueous solution and the catalyst precursor are mixed sufficiently uniformly, and the noble metal is sufficiently supported on the catalyst precursor by the next drying and calcining steps. For example, after the catalyst precursor immersed with the aqueous solution, by drying it at 100 to 250° C. for 10 minutes to 15 hours, and calcining at 350 to 600° C. for 10 minutes to 5 hours, the catalyst for the purification of exhaust gas of the present invention having the noble metal supported on the catalyst precursor can be produced.

Among the above preparation methods, the methods (1) and (2) are used preferably. More preferably, the method (1) is used.

The catalyst for the purification of exhaust gas of the present invention can be contacted with exhaust gas, for example, exhaust gas from fuel containing gasoline, to purify exhaust gas efficiently. In particular, the catalyst for the purification of exhaust gas of the present invention can be used suitably for exhaust gas which contains moisture and fluctuates between oxidizing atmosphere and reducing atmosphere.

In the present description, "containing moisture" means the moisture content in exhaust gas is 2 to 15% by volume, and preferably, moisture content in exhaust gas is 4 to 13% by volume.

In addition, "exhaust gas fluctuates between oxidizing atmosphere and reducing atmosphere" means a state where exhaust gas fluctuates in an oxidizing state, a reducing state and a stoichiometric state, provided that, as for balance between oxidizing components (oxygen and NOx) contained in exhaust gas and components to be oxidized (HC, CO, hydrogen), a state where the oxidizing components are rich is defined as an oxidizing state; a state where the components to be oxidized are rich is defined as a reducing state; and a state where amounts of both are the same is defined as a stoichiometric state. Gaseous components in exhaust gas are composed of a hydrocarbon (HC), carbon monoxide (CO), nitrogen oxide (NOx), carbon dioxide, hydrogen, nitrogen, and residual oxygen, and the like. If fuel is not combusted completely even in a stoichiometric state, oxygen would remain in exhaust gas.

Therefore, the catalyst for the purification of exhaust gas of the present invention may be used for purification of exhaust gas (in particular, NOx) of an internal combustion engine. In particular, the catalyst for the purification of exhaust gas of the present invention can be used as, what is called a NOx trapping catalyst, which stores NOx in an oxidizing atmosphere, and releases and reduces NOx in a reducing atmosphere.

That is, the present invention also provides a method for the purification of exhaust gas which comprises contacting the exhaust gas with the catalyst for the purification of exhaust gas of the present invention.

In the above method, a space velocity (S.V.) of exhaust gas is 10,000 to 300,000 $h^{-1}$, and preferably 10,000 to 100,000 $h^{-1}$.

As mentioned above, the catalyst for the purification of exhaust gas of the present invention can be used to purify exhaust gas from an internal combustion engine such as a gasoline engine and a diesel engine. That is, exhaust gas is purified by providing the catalyst for the purification of exhaust gas in exhaust gas. In the present invention, a position of providing the catalyst for the purification of exhaust gas of the present invention is not especially limited. Exhaust gas can be purified by providing the catalyst for the purification of exhaust gas of the present invention at an upstream side of exhaust gas, and providing a three-way catalyst or a hydrocarbon adsorbing agent at a downstream side; or by providing a three-way catalyst or a hydrocarbon adsorbing agent at an upstream side of exhaust gas, and providing the catalyst for the purification of exhaust gas of the present invention at a downstream side of exhaust gas, and the like. Adoption of such a method can purify exhaust gas efficiently.

EXAMPLES

Explanation will be given on effect of the present invention with reference to the following Examples and Comparative Example. However, technical scope of the present invention should not be limited to the following Examples.

A pore distribution and a pore volume were measured according to the following method.

<Measurement of Pore Distribution and Pore Volume>

Pore distribution and pore volume were measured using mercury intrusion technique. Specifically, by using as a sample a supported catalyst after heat treatment (degassing) at 200° C. for at least 30 minutes, and also using as a measurement apparatus "Autopore III9420W (manufactured by Shimadzu Corp.), measurement was carried out under conditions of at a pressure in the range of 0.5 to 60,000 psi (0.0034 to 413.7 MPa), for an equivalent time of 10 seconds and at measurement points of 60, to calculate pore distribution and pore volume by the Washburn equation represented by the following equation (2). In this case, surface tension of mercury is regarded to be 480 N/m, and contact angle of mercury is regarded to be 130 deg.

Equation (2): Washburn equation $D=-4\sigma \cos \theta/P$     [Expression 3]

wherein
D represents a pore diameter (m),
σ represents a surface tension of mercury (mN/m),
θ represents a contact angle of mercury (deg.), and
P represents a pressure (Pa).

Example 1

3 g of magnesium oxide, manufactured by Kyowa Chemical Industry Co., Ltd., (trade name: Kyowamag 30), 244 g of heat-resistant activated γ-alumina (trade name: SCFa140, manufactured by Sasol Co., Ltd.), 41 g of potassium acetate, an aqueous solution of dinitrodiammine platinum containing 3 g of platinum, and water were mixed, and by wet milling the resultant mixture using a ceramic ball mill at room temperature for 14 hours, aqueous slurry was obtained. A commercially available cordierite monolithic honeycomb substrate (600 cells/inch$^2$, diameter=24 mm, length=66 mm, volume=0.030 L) was immersed with the aqueous slurry, and excess slurry was blown off by compressed air. Then, it was dried for two hours, till no moisture loss at 150° C. was recognized, and calcined at 500° C. for 1 hour in an electric furnace, to obtain a complete catalyst (A). In the resultant catalyst, 3 g/L of platinum, 3 g/L of magnesium oxide, 19 g/L of potassium oxide, and 244 g/L of alumina were supported on the substrate.

Example 2

A complete catalyst (B) was obtained according to a similar method as in Example 1, except that magnesium oxide UC95-S, manufactured by Ube Material Industries, Ltd., was used instead of magnesium oxide (trade name: Kyowamag 30) manufactured by Kyowa Chemical Industry Co., Ltd., in Example 1. In the resultant catalyst, 3 g/L of platinum, 3 g/L of magnesium oxide, 19 g/L of potassium oxide, and 244 g/L of alumina were supported on the substrate.

Example 3

A complete catalyst (C) was obtained according to a similar method as in Example 1, except that used amount of the magnesium oxide was changed from 3 g to 2.5 g, and used amount of the heat-resistant activated alumina was changed from 244 g to 244.5 g. In the resultant catalyst, 3 g/L of platinum, 2.5 g/L of magnesium oxide, 19 g/L of potassium oxide, and 244.5 g/L of alumina were supported on the substrate.

Example 4

A complete catalyst (D) was obtained according to a similar method as in Example 1, except that used amount of the magnesium oxide was changed from 3 g to 5 g, and used amount of the heat-resistant activated alumina was changed from 244 g to 242 g. In the resultant catalyst, 3 g/L of platinum, 5 g/L of magnesium oxide, 19 g/L of potassium oxide, and 242 g/L of alumina were supported on the substrate.

Example 5

A complete catalyst (E) was obtained according to a similar method as in Example 1, except that used amount of the magnesium oxide was changed from 3 g to 10 g, and used amount of the heat resistant activated alumina was changed from 244 g to 237 g. In the resultant catalyst, 3 g/L of platinum, 10 g/L of magnesium oxide, 19 g/L of potassium oxide, and 237 g/L of alumina were supported on the substrate.

Comparative Example 1

A complete catalyst (X) was obtained according to a similar method as in Example 1, except that the magnesium oxide was not added in Example 1. In the resultant catalyst, 3 g/L of platinum, 19 g/L of potassium oxide, and 244 g/L of alumina were supported on the substrate.

(Evaluation 1: Aged Performance Test)

Figure 1:
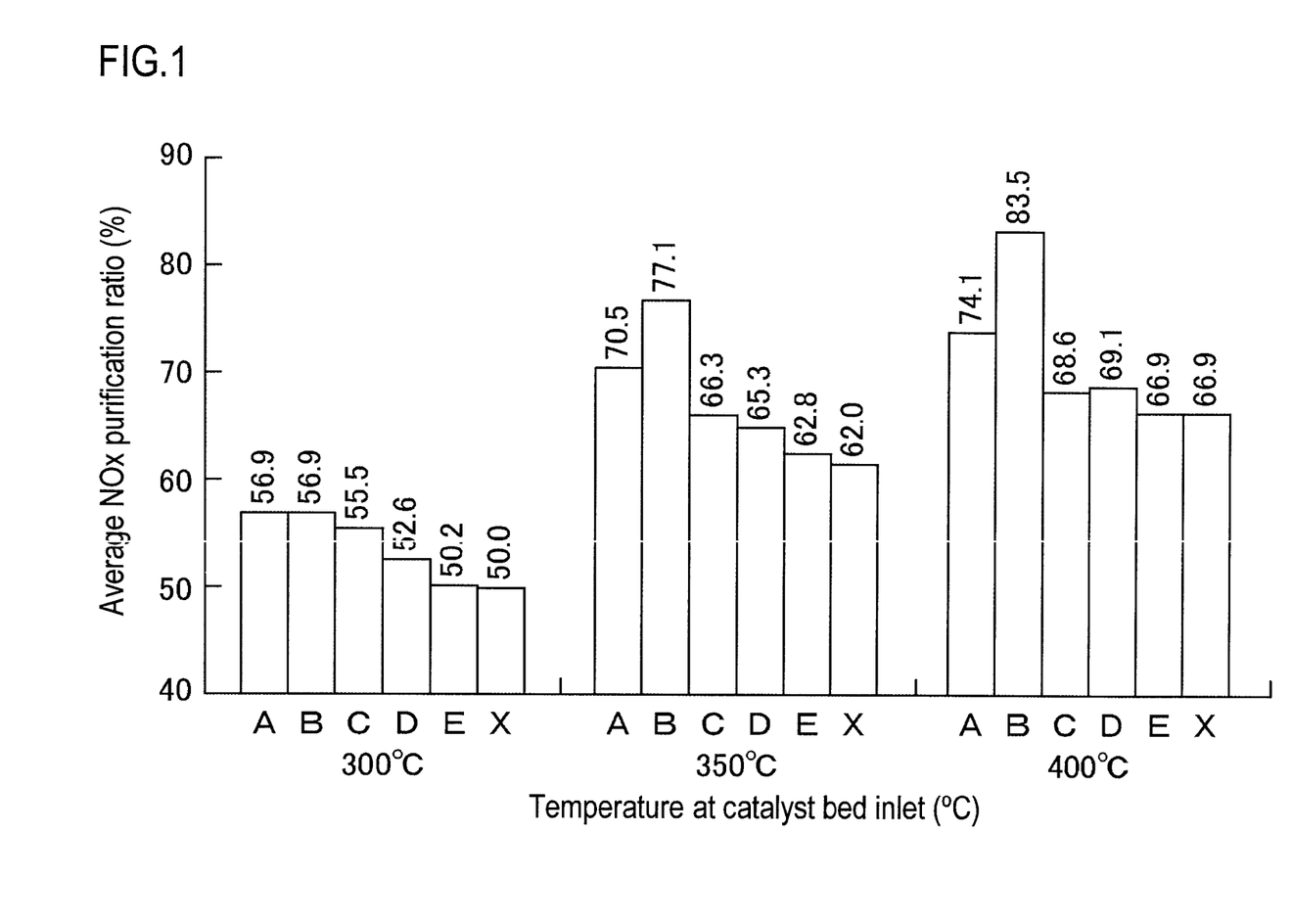
FIG. 1 is a graph showing average NOx purification ratios (%) at a temperature of catalyst bed inlet of 300° C., 350° C. and 400° C., on the complete catalysts (A) to (E) and (X), in an aged performance test.

The following test was carried out on the complete catalysts (A) to (E) prepared in the Examples 1 to 5, and the complete catalyst (X) prepared in Comparative Example 1. That is, firstly the catalyst was aged by being placed in an electric furnace at 800° C. for 50 hours. After that, the catalyst was filled in a stainless reaction tube, and reaction gas with a composition shown in the following Table 1 was introduced into the reaction tube at a space velocity of 60,000 h$^{-1}$, to determine an average NOx purification ratio (%) at a temperature of catalyst bed inlet of 300° C., 350° C. and 400° C. and to evaluate catalyst performance. Results are shown in the following Table 2 and FIG. 1.

TABLE 1

|  | Condition 1 (Reducing atmosphere) | Condition 2 (Oxidizing atmosphere) |
|---|---|---|
| $C_3H_6$ | 1% C | 4000 ppmC |
| CO | 3% | 2000 ppm |
| NO | 600 ppm | 600 ppm |
| $O_2$ | 1.10% | 10% |
| $CO_2$ | 7% | 7% |
| $H_2O$ | 7% | 7% |
| Time | 10 sec | 50 sec |

TABLE 2

| | Average NOx purification ratio at temperature of each catalyst bed inlet (%) | | |
|---|---|---|---|
| Catalyst | 300° C. | 350° C. | 400° C. |
| A | 56.9 | 70.5 | 74.1 |
| B | 56.9 | 77.1 | 83.5 |
| C | 55.5 | 66.3 | 68.6 |
| D | 52.6 | 65.3 | 69.1 |
| E | 50.2 | 62.8 | 66.9 |
| X | 50 | 62 | 66.9 |

(Evaluation 2: Measurement of Pore Volume)

The complete catalysts (A) and (B) prepared in the above Examples 1 and 2, and the complete catalyst (X) prepared in Comparative Example 1 were tested for pore distribution by using mercury intrusion technique. As for each of the catalysts, positions (μm) of the first and the second peaks, a ratio (%) of pore volume in the range of 1 to 5 μm which corresponds to the first peak, relative to total pore volume, and a ratio of pore volume in the range of 0.1 to 1 μm which corresponds to the second peak, relative to pore volume in the range of 1 to 5 μm which corresponds to the first peak, are shown in the following Table 3. In addition, a graph of logarithmic differential pore volume distributions of the complete catalysts (A), (B) and (X) are shown in FIG. 2.

TABLE 3

| Catalyst | Position of first peak (μm) | Position of second peak (μm) | Ratio of pore volume in 1-5 μm, relative to total pore volume (%) | Pore volume in 0.1-1 μm/ Pore volume for 1-5 μm |
|---|---|---|---|---|
| A | 2.50 | 0.38 | 18.0 | 1.9 |
| B | 2.50 | 0.38 | 18.4 | 1.7 |
| X | None | 0.57 | 4.9 | — |

Figure 2:
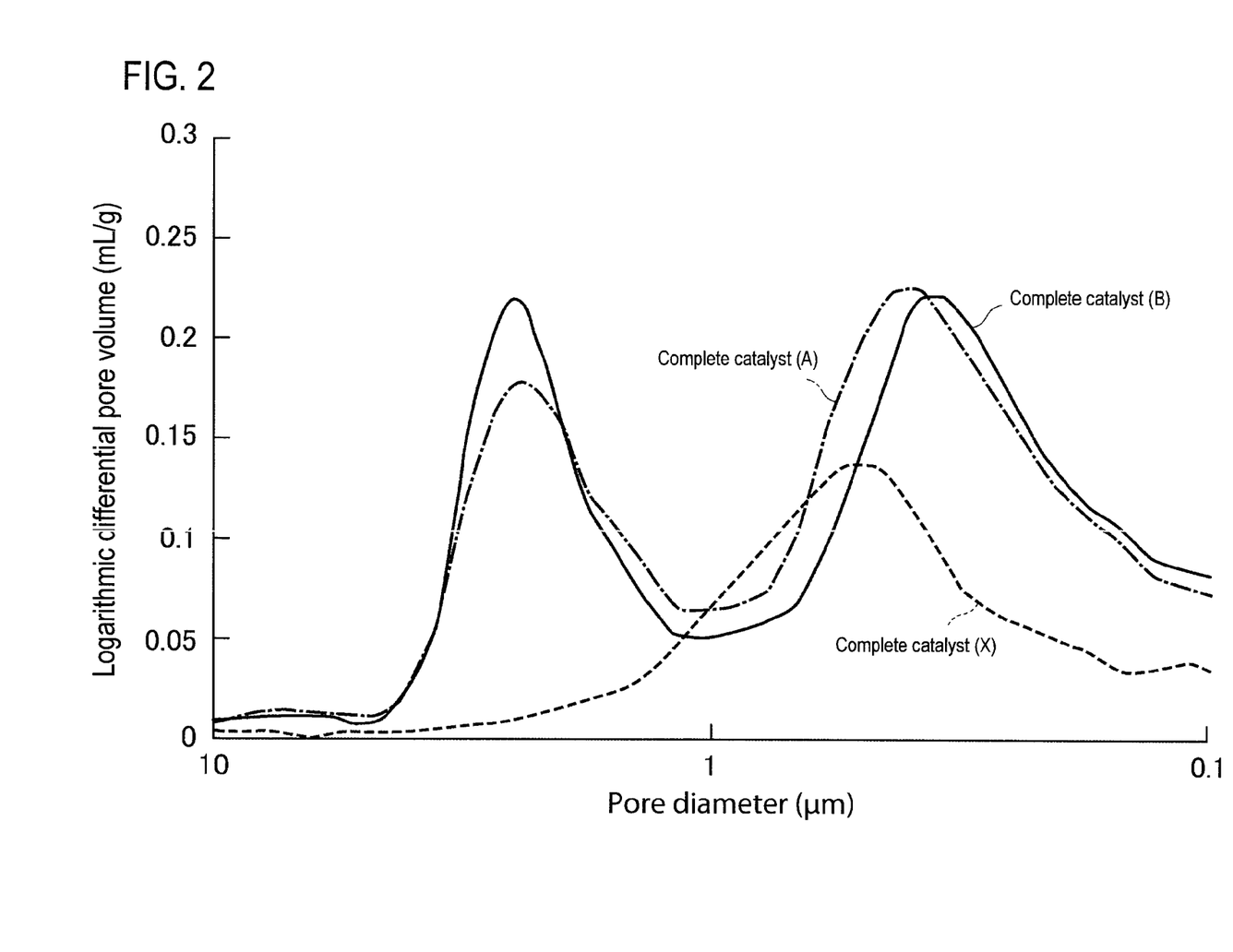
FIG. 2 is a graph showing logarithmic differential pore volume distributions of the complete catalysts (A), (B) and (X), in measurement of pore volume.

It is noted from FIG. 2 that there is difference of pore distribution between the complete catalyst (A) and the complete catalyst (B). From Table 2, it is shown that the complete catalyst (B) has a lager ratio of pore volume in the range of 1 to 5 μm which corresponds to the first peak relative to total pore volume, as compared with the complete catalyst (A). Table 1 indicates that the complete catalyst (B) has a particularly high NOx purification ratio, indicating that magnesium oxide with a larger ratio of the pore volume in the range of 1 to 5 μm which corresponds to the first peak, relative to the total pore volume, is more preferable.

The invention claimed is:

1. A catalyst for the purification of exhaust gas having a catalyst layer of catalyst components comprising a noble metal, magnesium oxide, and a refractory inorganic oxide formed on a three-dimensional structure, wherein the catalyst layer has two peaks originated from the magnesium oxide in a pore distribution obtained by mercury intrusion technique and the two peaks are composed of a first peak present in the range of 1 to 5 μm, and a second peak present in the range of 0.1 to 1 μm.

2. The catalyst for the purification of exhaust gas according to claim 1, wherein ratio of pore volume in the range of 1 to 5 μm corresponding to the first peak is 5 to 30%, relative to total pore volume.

3. The catalyst for the purification of exhaust gas according to claim 2, wherein ratio of pore volume in the range of 0.1 to 1 μm corresponding to the second peak is 0.5 to 30%, relative to pore volume in the range of 1 to 5 μm corresponding to the first peak.

4. The catalyst for the purification of exhaust gas according to claim 3, wherein the amount of the magnesium oxide is 0.5 to 10 g per 1 L of the three-dimensional structure.

5. The catalyst for the purification of exhaust gas according to claim 4, which further comprises an oxide of at least one element selected from the group consisting of alkali metals, alkaline earth metals, rare-earth elements, manganese and tungsten, as the catalyst component.

6. The catalyst for the purification of exhaust gas according to claim 3, which further comprises an oxide of at least one element selected from the group consisting of alkali metals, alkaline earth metals, rare-earth elements, manganese and tungsten, as the catalyst component.

7. The catalyst for the purification of exhaust gas according to claim 2, wherein the amount of the magnesium oxide is 0.5 to 10 g per 1 L of the three-dimensional structure.

8. The catalyst for the purification of exhaust gas according to claim 7, which further comprises an oxide of at least one element selected from the group consisting of alkali metals, alkaline earth metals, rare-earth elements, manganese and tungsten, as the catalyst component.

9. The catalyst for the purification of exhaust gas according to claim 2, which further comprises an oxide of at least one element selected from the group consisting of alkali metals, alkaline earth metals, rare-earth elements, manganese and tungsten, as the catalyst component.

10. The catalyst for the purification of exhaust gas according to claim 1, wherein the amount of the magnesium oxide is 0.5 to 10 g per 1 L of the three-dimensional structure.

11. The catalyst for the purification of exhaust gas according to claim 10, which further comprises an oxide of at least one element selected from the group consisting of alkali metals, alkaline earth metals, rare-earth elements, manganese and tungsten, as the catalyst component.

12. The catalyst for the purification of exhaust gas according to claim 1, which further comprises an oxide of at least one element selected from the group consisting of alkali metals, alkaline earth metals, rare-earth elements, manganese and tungsten, as the catalyst component.

13. A method for the production of the catalyst for the purification of exhaust gas as set forth in claim 1, which comprises:
dispersing the noble metal, the magnesium oxide and the refractory inorganic oxide into an aqueous medium, subjecting the resultant dispersion to wet milling to obtain slurry, and immersing the three-dimensional structure with the slurry, removing excess slurry, and drying and calcining the three-dimensional structure; or
dissolving a water-soluble noble metal salt into water, supporting the noble metal onto the refractory inorganic oxide to obtain a noble metal-supported refractory inorganic oxide, dispersing the noble metal-supported refractory inorganic oxide and the magnesium oxide into an aqueous medium, and subjecting the resultant mixture to wet milling to obtain slurry, and immersing the three-dimensional structure with the slurry, removing excess slurry, and drying and calcining the three-dimensional structure.

14. A method for the purification of exhaust gas which comprises contacting the exhaust gas with the catalyst for the purification of exhaust gas as set forth in claim 1.

* * * * *